Feb. 16, 1965 J. M. EWELL 3,169,652
METHOD FOR LOADING AND UNLOADING VEHICLES
Filed July 10, 1963 4 Sheets-Sheet 1
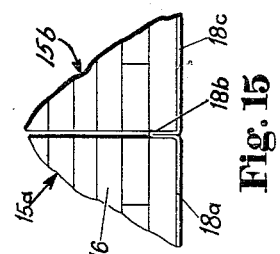
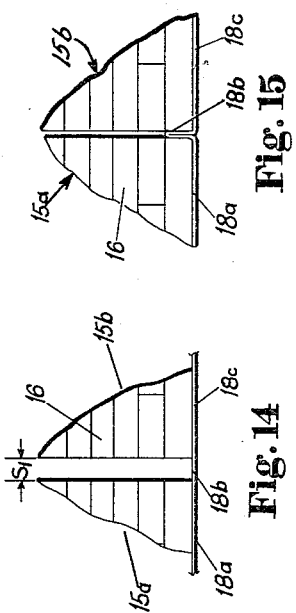
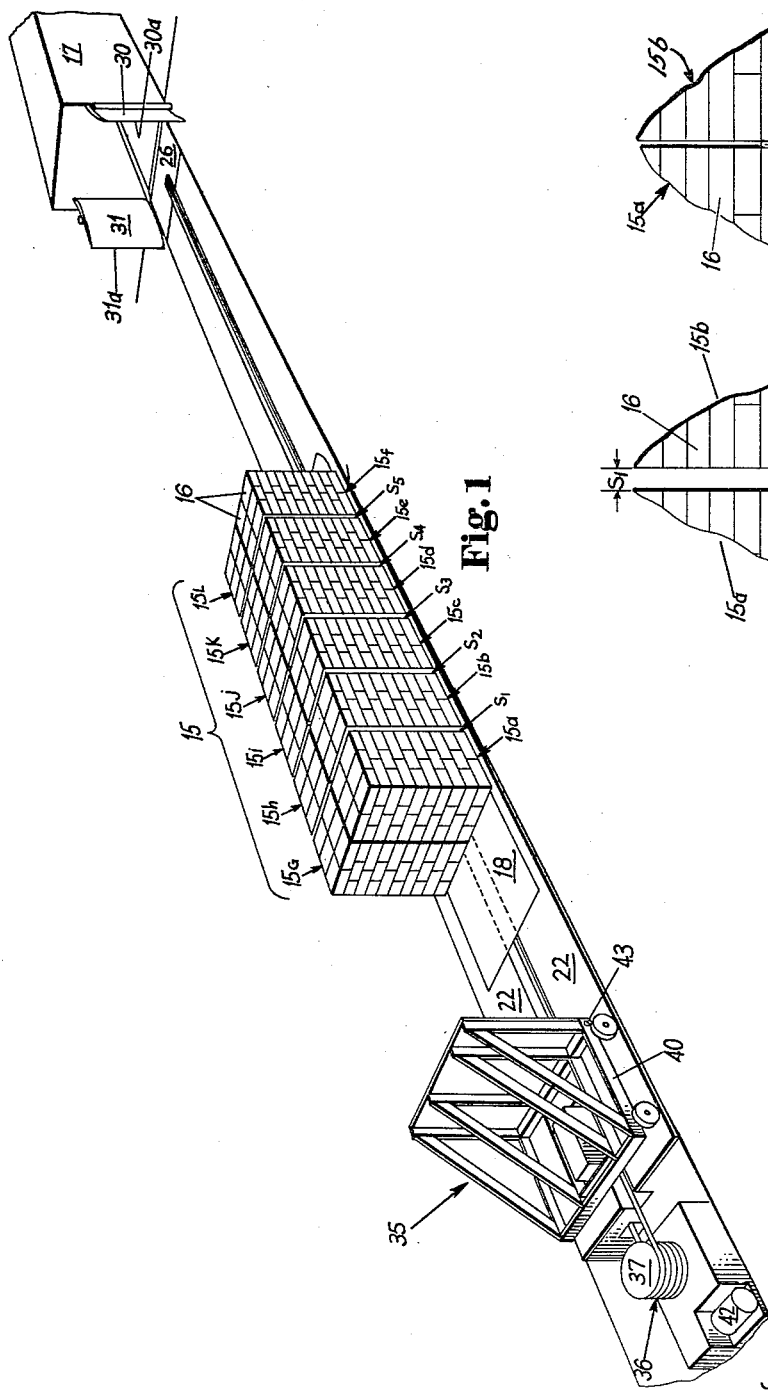
INVENTOR.
JAMES M. EWELL
BY
ATTORNEY

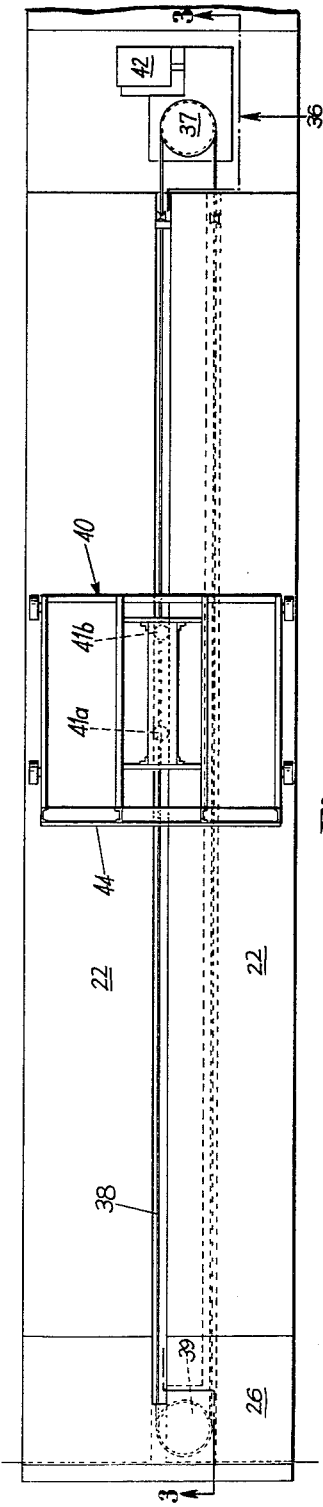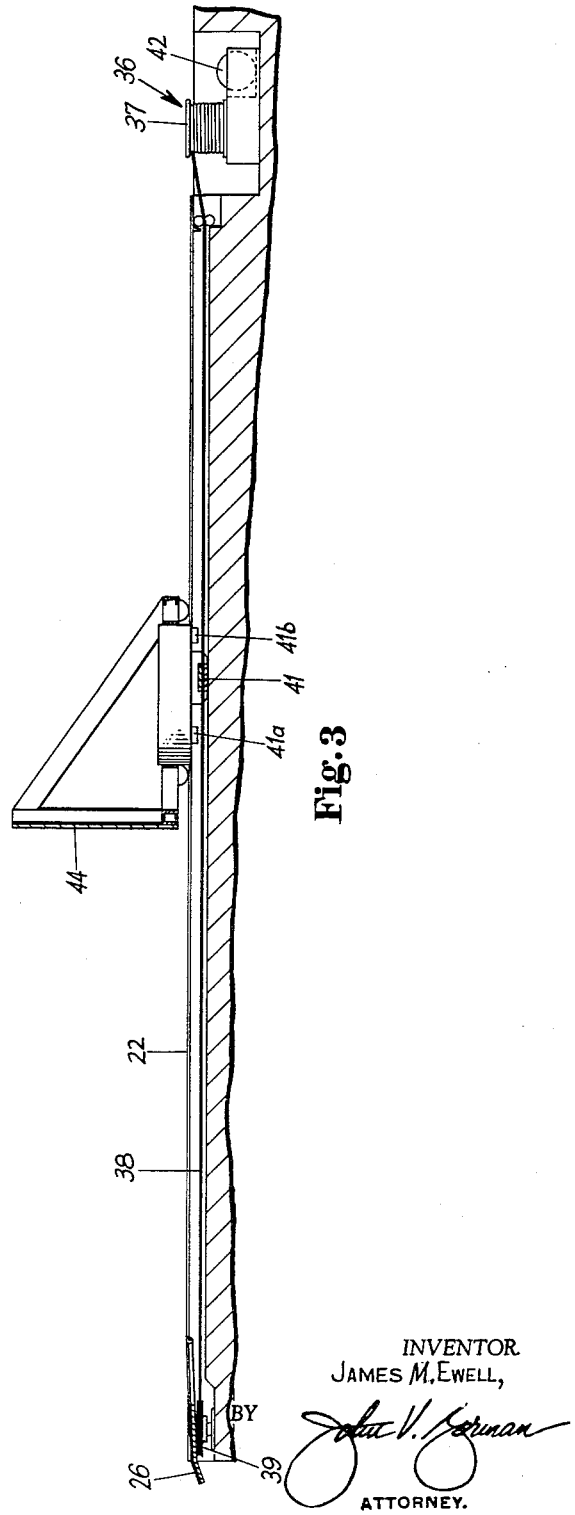

Feb. 16, 1965  J. M. EWELL  3,169,652
METHOD FOR LOADING AND UNLOADING VEHICLES
Filed July 10, 1963  4 Sheets-Sheet 3
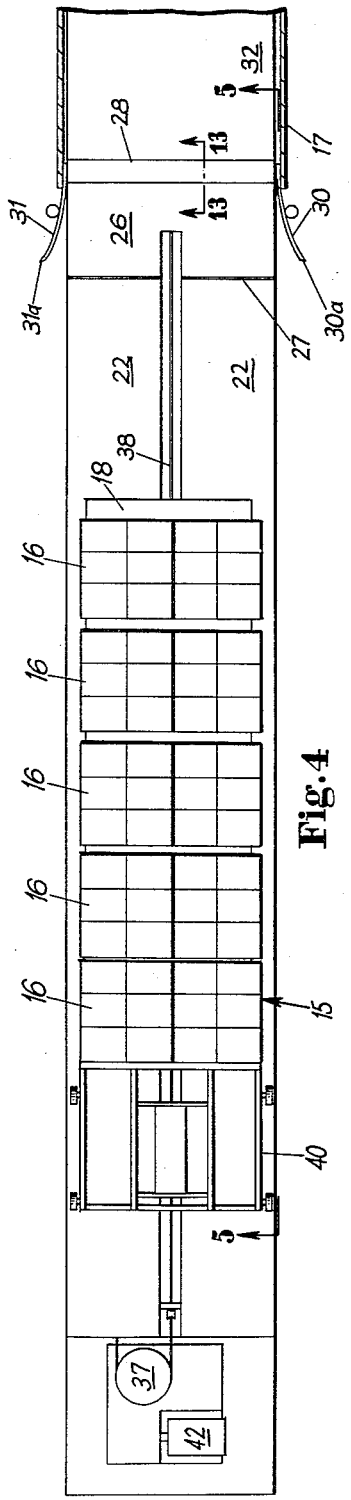
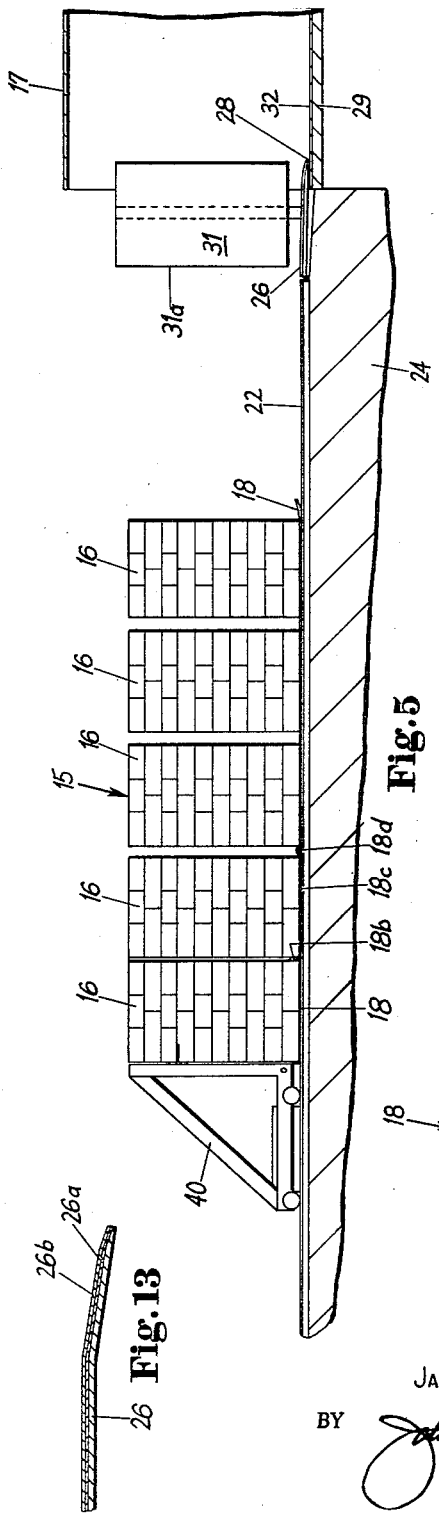
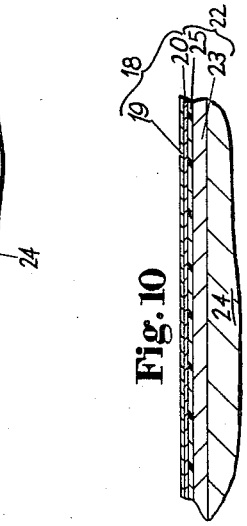
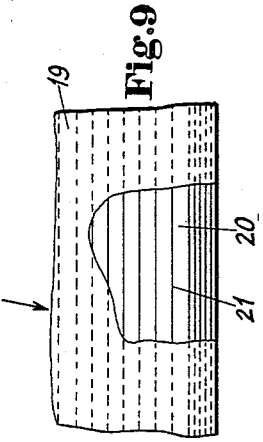
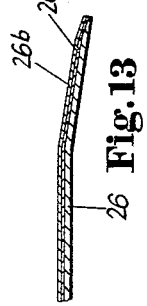
INVENTOR.
JAMES M. EWELL,
BY
ATTORNEY.

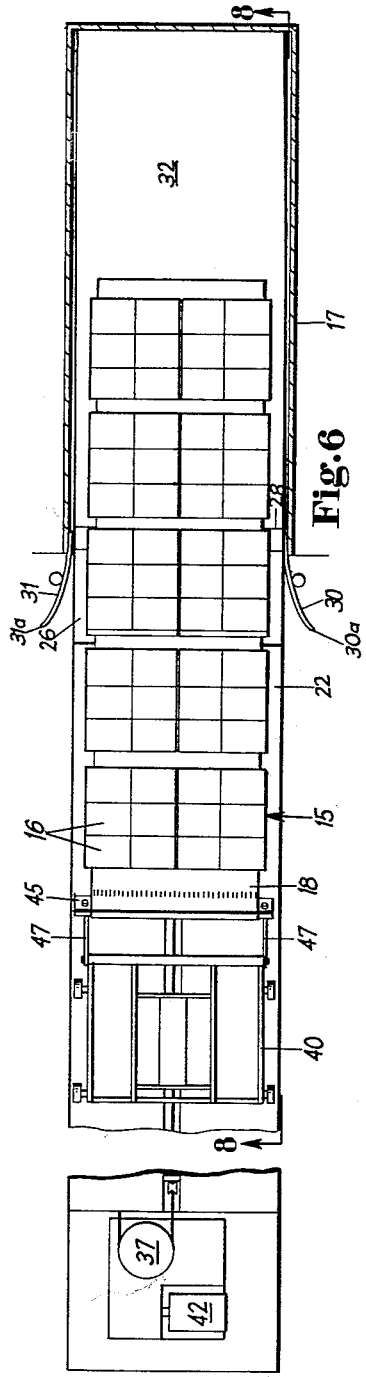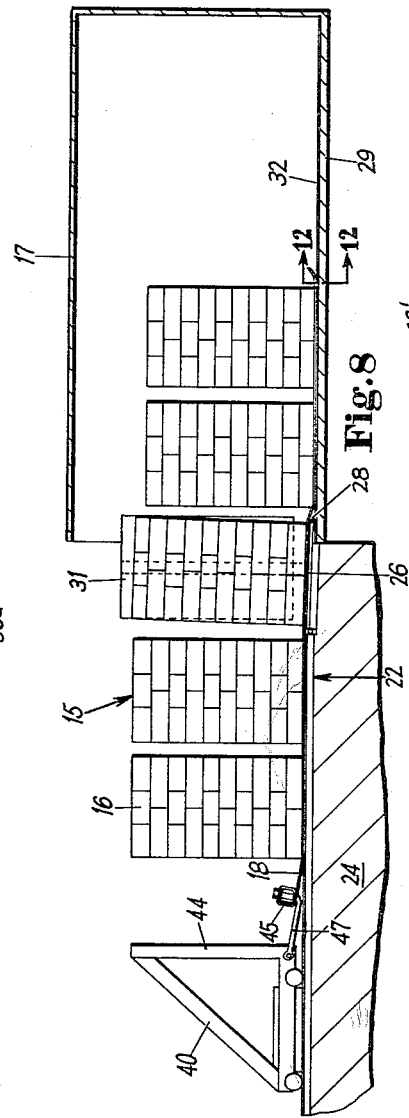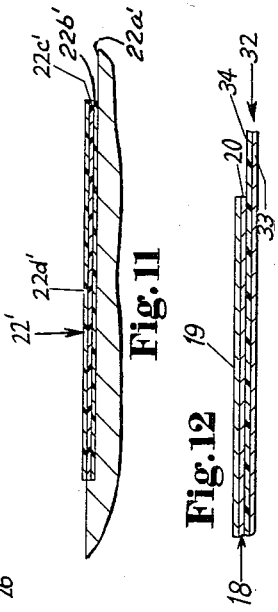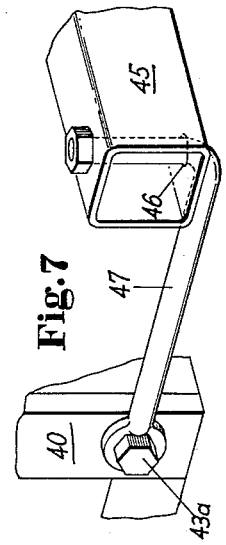

United States Patent Office 3,169,652
Patented Feb. 16, 1965

3,169,652
METHOD FOR LOADING AND UNLOADING
VEHICLES
James M. Ewell, Cincinnati, Ohio, assignor to The
Procter & Gamble Company, Cincinnati, Ohio, a
corporation of Ohio
Filed July 10, 1963, Ser. No. 294,032
6 Claims. (Cl. 214—152)

This invention relates to a method for loading and unloading vehicles intended to transport materials from one location to another and, more particularly, to a method of loading and unloading pre-assembled quantities of goods intended for handling primarily by the clamp type industrial materials handling trucks.

The presently used methods of loading vehicles (for example, highway vans) are principally: (a) by hand or (b) by depositing pallet loads of product in the van. Loading by hand presents several disadvantages. First of all, the material to be transported must be accumulated and carried to the vehicle by means of pallets. Then the individual packages of the material must be carried or transported by other means into the van. Upon reaching the destination the packages must be carried out of the van and palletized and/or assembled into units for further handling. The foregoing involves substantial amounts of manpower and requires the expenditure of considerable time, tying up both van and truck dock at the loading and unloading points. This latter fact accounts for the necessity for warehouses to be designed so as to provide a great many duplicate truck loading and unloading sites, a costly capital expenditure.

Loading by using pallets is expensive since the pallets must either be returned or so constructed as to be expendable, and since such a system requires that ample truck space be left open for manipulating the pallets to get them into position. Moreover, the pallets themselves occupy truck space which might otherwise be filled with product to be shipped. To date expendable pallets have not reached substantial commercial acceptance because of relatively high cost considerations.

Various other schemes for the loading and unloading of preassembled shipments have been proposed in the past, but these, too, were commercially unacceptable due to equipment costs, inconvenience, and, generally, to impracticability.

In order to obviate the above difficulties a new method and apparatus to load and unload vehicles was developed, as covered in the application for U.S. Letters Patent Serial No. 294,080 filed concurrently herewith by Arthur Spinanger and Robert V. Burt and assigned to the assignee of the present invention. The present invention is an improvement over the Spinanger and Burt invention.

The present invention is designed most specifically for use in connection with the assembling and disassembling of quantities of goods by means of clamp trucks. The prior practice where clamp trucks deposit the load directly in a van has been to load from the end, that is to say by placing the individual units (clamp truck loads) to be shipped in rows, the rows being lengthwise in the van with each of the row-forming units in contact with the unit ahead or behind it. The rows themselves are generously separated from each other and from the sidewalls of the van to allow for operation of the clamp arms or pads of the clamp truck and for the lack of adequate maneuvering space in the van. Such an arrangement is generally stable lengthwise but necessitates load stabilization devices to prevent lateral load shifting and to maintain clearance for clamp pad operation at the receiving point. Load stabilization devices might be inflated rubber dunnage, expanded paper honeycomb, wood or other like materials and are expensive and generally inconvenient to provide and install.

One object of the present invention is to provide a method by which preassembled quantities of goods to be shipped may be rapidly loaded and unloaded from vehicles, utilizing truly expendable means accompanying such shipments, which may be adapted without incurring exorbitant capital expenditures for changes in existing warehouses and which is designed to facilitate clamp truck assembly and disassembly of the load at the shipping and receiving warehouses respectively.

Briefly stated, in accordance with one aspect of this invention the method comprises providing a slide path extending into the vehicle to be loaded, placing a thin flexible web on the slide path parallel thereof, assembling the unitized load, comprising a plurality of load segments, on the web with the segments arranged in a row and in spaced relationship thereon, causing a sequential and cumulative movement of the load segments in the direction of the vehicle by sliding action of the web on the slide path in order to result in the folding upon itself of the web material intermediate the spaced load segments to thereby longitudinally compact the unitized load, and thereafter sliding the compacted unitized load into the vehicle.

While the specification concludes with claims particularly pointing out and distinctly claiming the subject matter which is regarded as the present invention, it is believed that the invention will be better understood from the following description taken in connection with the accompanying drawings, in which:

FIGURE 1 is a perspective view of a warehouse loading dock and a highway van in loading position, with a load placed in position with respect to the balance of the elements used in the practicing of this invention;

FIGURE 2 is a plan view of apparatus adapted to apply motive power for loading and unloading of cargo;

FIGURE 3 is a section taken along line 3—3 of FIGURE 2;

FIGURE 4 is a plan view of the loading operation in progress;

FIGURE 5 is a section taken along line 5—5 of FIGURE 4;

FIGURE 6 is a plan view of the unloading operation in progress;

FIGURE 7 is an enlarged fragmentary perspective view of the drawbar combination employed in unloading;

FIGURE 8 is a section taken along line 8—8 of FIGURE 6;

FIGURE 9 is a partly broken fragmentary plan view of one construction of a sled adapted for use in connection with the present invention;

FIGURE 10 is an enlarged fragmentary view taken in cross section through the sled and dock runway of FIGURE 5;

FIGURE 11 is an enlarged fragmentary view in section of an alternative dock runway;

FIGURE 12 is an enlarged fragmentary sectional view taken through the superposed sled and van runway;

FIGURE 13 is an enlarged fragmentary sectional view taken through the dockboard shown in FIGURES 1–5 and 8;

FIGURE 14 is a fragmentary elevation showing the spacing of the segments comprising the unitized load; and FIGURE 15 is a view similar to FIGURE 14 but showing the folded condition of the webs intermediate the segments of the unitized load following consolidation during the loading operation.

Referring to FIGURE 1, there is shown a preassembled load 15, consisting of a plurality of load segments or units 15(a) through 15(l) placed on a sled 18 to be described. Each of the segments comprises a multiplicity of containers 16 stacked in interlocking engagement as is the normal practice in preparing cargo for shipment. The placement and positioning of the containers 16 to form the load segments can be accomplished by hand or by mechanical means, the operation and details of which are well known in the materials handling art. As shown, the load 15 is made of a pair of juxtaposed rows of the segments 15(a) through 15(l), the adjacent segments in each row being spaced from each other by a distance S. The spacing intermediate segments 15(a) and 15(b) is termed $S_1$, between 15(b) and 15(c) as $S_2$ and so on whereby the six unit loads in each row have spaces $S_1$ through $S_5$ separating them.

In the case of loads 15 containing more than one row on a sled 18, it is desirable that the units or segments comprising the rows align laterally. For example, segments 15(a) and 15(g) are substantially even with one another in position, as are 15(b) and 15(h), 15(c) and 15(i), 15(d) and 15(j), 15(e) and 15(k) and 15(f) and 15(l). Thus, spacing $S_1$ extends tranversely for the entire width of the load 15 and the same is true of spacings $S_2$ through $S_5$. Also, and as shown in the drawings, the rows should be placed closely together to eliminate the necessity of using fillers or load stabilization devices to prevent load shifting during the transporting operation.

The segments 15(a) through 15(l) are placed on the sled by means of clamp type industrial materials handling trucks. These clamp trucks are well known by those of ordinary skill in the materials handling art and a detailed description thereof is considered unnecessary. It will suffice to say that clamp trucks utilize two clamp pads, each of which is adapted to engage one of the opposed sides of a unit to be moved thereby. The clamp pads are urged inwardly so as to exert a squeezing action on the unit, the compressing pressure on the unit being great enough to maintain its integrity when it is raised off the warehouse floor or other support by the clamp pads for movement to the desired location. The frictional engagement of the vertical surfaces of the packages comprising the unit, of course, prevents the dropping of those which are otherwise unsupported in the central portion of the unit.

When placing the segments or units 15(a) through 15(l) on the sled 18, the clamp truck approaches from the side of the sled 18 on which the unit is to be located. Such an approach eliminates the necessity of the truck traveling on the sled 18 or the runway 22 on which the sled is positioned. The side approach causes the clamp pads of the truck to extend transverse the length of the sled and consequently space must be left between the segments to permit the clamp pads to release a segment and be withdrawn. The spacing between the segments should preferably be at least 4″ wide in order to assure adequate room for the clamp pad.

If the preassembled load 15 is to be the only cargo loaded into highway van or trailer 17, then desirably the load 15 will be approximately 82 to 86 inches in width, slightly less than about 40 feet long (aside from the spaces) and of a height variable according to the density of the goods being shipped. Generally speaking, over-the-road trailers or vans such as van 17 have a bed area 90 to 92½ inches in width and 40 feet long. Consequently, when the preassembled load 15 is inserted in the van 17 following the operations hereinafter described, it lacks about 7 inches of filling the van 17 in width and about 2 to 5 inches in length.

As above indicated, the intended cargo, the preassembled load 15, is stacked upon a flexible sled 18, desirably of width about 2 inches narrower than that of the load 15 and approximately 8 to 12 feet longer. Thus, the sled preferably is about 80 to 84 inches wide and about 50 feet long. The load 15 is centered over the width of the sled 18 and the end of the load nearest the van 17 is located close to the corresponding end of the sled 18. Such positioning leaves most of the uncovered length of the sled 18 on the end thereof furthermost from the van 17 and available, as will be later made clear, for use in the subsequent unloading operation.

While the required strength of the sled material will vary in accordance with the frictional and inertial forces encountered, it has been found that for preassembled loads of approximately 50,000 pounds and with the coated runway materials hereinafter described, the tensile strength of the sled 18 should preferably be at least about 125 pounds per inch of width. The material should also be thin and of such flexibility that it may be formed into a compact roll which occupies relatively little space. These properties facilitate the rolled storage of sled material prior to use and enable the sleds to be transported or returned to the shipper, taking up a minimum of space.

In addition to the flexibility and strength requirements, the sled 18 should possess sufficient wet strength to operate over the relative humidity range that will be encountered and be capable of being folded and creased without greatly affecting its tensile strength. Moreover, the material should be inexpensive and its other properties, for example, flexibility, should not change when exposed to normal extremities of climatic conditions.

FIGURES 9, 10 and 12 show a sled 18 constructed of two sheets of kraft paper 19 and 20 laminated in face-to-face contact with reinforcing fibers 21 running lengthwise therebetween. The reinforcing fibers may be jute, cotton or any other suitable filament type of material. One suitable combination of materials for such construction comprises two sheets of kraft paper laminated together by a suitable adhesive and containing 2 to 3 reinforcing fibers per inch of width. Where the reinforcing fibers are jute the composite sheet has a basis weight of approximately 190 pounds per ream of 3000 square feet and a tensile strength of about 125 pounds per inch of width.

While the above describes a laminated filament reinforced sled, it should be realized that any sheet or film material which fulfills the physical requirements will be satisfactory and a laminated construction is not essential. In this connection, a material such as Sorex 54936 (a heavy weight paper stock presently sold by Sorg Paper Co. and having a basis weight of approximately 200 pounds per ream of 3000 square feet and a tensile strength in the machine direction of 200 pounds per inch of width) has also been found satisfactory.

As shown in FIGURE 9, the sled 18 may be extra-reinforced along its longitudinal edges by means of spacing the fibers 21 more closely along the outer 3 or 4 inches of the sled 18 width. Such extra-reinforcing is desirable in order to compensate for any minor misalignment of the load from the direction of movement in the unloading operation, as will be more fully understood from the balance of this specification.

Referring once more to FIGURE 1, the sled 18 in its unitizing position overlies a dock runway 22 having a top surface which in combination with the lower face of sled 18 has coefficients of static ($fsd$) and kinetic friction which are substantially lower than the coefficient of static friction ($fsl$) between the bottom surfaces of containers 16 comprising the unitized load 15 and the top surface of sled 18. In order to assure proper operation under most circumstances it is preferable that $fsl$ be measurably greater than $fsd$. A very satisfactory arrangement has been found consistently operative where $fsl$ is equal to or greater than 1.25 $fsd$ (or $fsd$ equal to or less than about .8 $fsl$) and $fsd$ is less than approximately .20.

With respect to specific contacting surfaces the coefficient of kinetic (or sliding) friction is smaller than the coefficient of static friction within the range of practical sliding velocities. This point is important and a distinct advantage is gained by capitalizing on this differential in practicing the present invention. This will be more fully explained in describing the loading and unloading operation.

As shown in FIGURE 10, the dock runway 22 can comprise a floor overlay 23 made of a row of exterior plywood panels or the like, preferably fastened to the floor 24 of the warehouse by means not shown, the variations of which are well known in the art. For example, the overlay 23 may be adhered directly to the floor 24 by an adhesive such as epoxy cement, or, alternatively, could be secured to a network of lath which in turn is secured to the floor 24 by anchors, concrete nails or the like. The seams of the panels of material comprising the overlay 23 should be smooth and the contiguous edges thereof made to match closely. The overlay 23 should be positioned in alignment with the truck loading position and in order to handle a full van 17 load should measure about 90 inches wide. The length of the dock runway and consequently, of the overlay 23 may be varied according to the needs of the warehouse, terminating approximately 3 feet short of the edge of the warehouse loading dock.

Superposed over and secured to the floor overlay 23 is a film or sheet 25. Thus, the overlay forms a foundation or base for the film or sheet. The film or sheet 25 must be durable (abrasion resistant), inexpensive in terms of cost per use and in combination with the lower surface of the sled 18 must have the low coefficient of static and kinetic friction as described above. One suitable material may be plastic comprising high density polyethylene having a thickness of about $\frac{1}{16}$ of an inch, which can be stapled to the overlay 23, or, alternatively, bonded to the overlay 23 by means of adhesives and an intermediate sheet of paper (the polyethylene bonded to paper which in turn is bonded to the overlay 23).

It should be understood that many materials will be found to be satisfactory for use as the film or sheet 25 and the above described material is merely illustrative of the type contemplated for use in connection with this invention.

An alternative construction for the dock runway is shown in FIGURE 11. This form of construction is well adapted for use in a warehouse having a concrete floor. For the sake of clarity, the alternative dock runway 22' is shown recessed in the floor, but it should be understood that such recessing is not essential to the operation of the loading or unloading operation.

As shown, the dock runway 22' comprises a smooth concrete surface 22a' covered by a multiplicity of coats of plastic finish material. For example, there may be coats 22b', 22c' and 22d', all of which may be one part, oil-free moisture drying urethane varnish such as the urethane floor varnish sold by E. I. du Pont de Nemours & Co., Inc. under the trademark "Imron." Alternatively, coat 22b' may be a primer such as a two part polyamide cured epoxy finish along with superposed coats 22c' and 22d' of either urethane varnish as described above or a catalyzed 2 part urethane enamel, such as sold by Better Finishes & Coatings Co., Code No. 91–02. Suitable primers are currently sold by The Glidden Co., as "Nupon Epoxy" and by E. I. du Pont de Nemours & Co., Inc. as "Corlar Epoxy." Another alternative is to incorporate a silicon compound or powdered Teflon in the coat 22d'.

If an existing rough warehouse floor is being adapted for use in forming a dock runway 22', the smooth surface 22a' may be produced by means of the well known terrazzo grinding process. Frequently, deep grease penetration will be encountered in older warehouses and it will be necessary to etch the smooth surface with muriatic acid in order to assure good bonding of the coat 22b'.

Abutting the outer end of the dock runway 22 and functioning as an extension thereof interconnecting the dock with the van 17 is a dockboard 26. The proximal end 27 as shown in FIGURE 4 of the dockboard 26 is pivotally mounted on lugs, not shown, secured to the warehouse floor 24 and is flush and fits closely to the adjacent end of the runway 22 or 22'. To compensate for variations in the height of the bed 29 of the van 17, the distal end 28 of the dockboard is turned down as shown in FIGURES 5 and 8.

Preferably, the dockboard is approximately as wide as the preassembled load 15 and about 3½ feet long, extending a few inches into the van 17. While the dockboard 26 may be constructed of any suitable rigid material, it is thought advantageous to use ⅝" thick magnesium plate. The upper surface of the dockboard 26 is covered with a material designed to provide a continuity of the low coefficient of static and kinetic friction with the lower surface of sled 18. As disclosed in FIGURE 13 the material may comprise two coats of plastic finish. One suitable upper dockboard surface has been prepared by using a coat 26a of vinyl wash primer such as the Sherwin Williams Co. "Grip Clad" primer and then applying a coat 26b of urethane varnish or enamel as described previously in connection with rock runway 22'.

A pair of oppositely disposed arcuately formed vertical guides 30 and 31 are pivotally mounted on pipes anchored in the warehouse floor 24. The guides 30 and 31 are located on either side of the dockboard 26 and as will be understood by reference to FIGURES 1, 4 and 6 are positioned to funnel smoothly the load 15 into the van 17 during the loading operation. The arcuate configuration of the vertical guides 30 and 31 not only places the inner ends 30a and 31a thereof in position to commence the funneling action, but in addition compensates for off-center placement of the van 17 without excessively reducing the van 17 width available for loading. In this connection, if the vertical guides 30 and 31 were planar, then off-center placement of the van 17 would cause the outer end of one of the guides to extend substantially further away from its respective side of the van 17 than would be the case with the illustrated arcuate construction, thereby reducing the effective loading width of the van 17.

Preferably, the inner surface of each of the vertical guides 30 and 31 is smooth, and may, if desired, be covered with a material similar to that used for film or sheet 25 or coated with a plastic finish material as discussed hereinabove with respect to coatings for alternative dock runway 22'.

As shown most clearly in FIGURES 5 and 8, a vehicle or van runway 32 overlies the bed 29 of the van 17. The van runway 32 should cover substantially all of the cargo loading area of the van 17 and preferably comprise a single sheet having dimensions approximating that of the van 17 bed, although two or more overlapping sheets extending the full length of the van 17 have been found satisfactory. While the van runway 32 can be affixed to the bed 29 of van 17, such is unnecessary in most cases and in the interest of economy should be left loosely in position.

The van runway 32 is a thin, flexible web having a high-slip or low friction upper surface and preferably a substantially less slippery lower surface. In the case of the van runway 32, it is important that the coefficients of static and kinetic friction between the bottom surface thereof and the bed 29 of the van 17 be higher than that between the upper surface of the van runway 32 and the lower surface of the sled 18. Here, too, a ratio of at least about 1.25:1 is desirable.

One suitable material for the van runway 32 is shown in FIGURE 12, comprising a kraft paper 33 having a basis weight of about 70 to 90 pounds per ream of 3000 square feet, the upper surface of which has been coated with a 1 mil thick layer 34 of low density polyethylene, such as U.S. Industrial Chemicals Polycoating formulation 203–49. In combination with the filament reinforced sled described above, such a van runway has (according to experimental tests) a coefficient of static friction of about .10 and a coefficient of kinetic friction of approximately .09, both of which are very satisfactory in view of the coefficient of static friction of about .25–.30 between the average van bed 29 and the kraft side of the runway 32.

Another suitable van runway material is a glassine paper having a basis weight of about 50 pounds per ream of 3000 square feet, the upper surface of which is coated with a 1 mil thick layer of silicone, for example, Dow #22 silicone. In addition to the above, it is feasible to construct such a runway of a 70–90 pound kraft paper coated on one side with a 1 mil layer of Tenite, a thermoplastic made from a cellulose ester (e.g., cellulose acetate or cellulose acetate butyrate).

The van runway 32 material is maintained in roll form in the warehouse on a portable roll holder (not shown) and the van runway 32 may be cut to length according to the length of the van 17. It is necessary, as shown in FIGURES 5 and 8 that the rear edge of the van runway 32 be overlapped by the distal end 28 of the dockboard 26 during the loading operation.

Apparatus for supplying motive power is generally indicated by reference numeral 35. While many devices may be used for such an application, one preferred embodiment is illustrated in FIGURES 2 and 3 as comprising an electrically powered, motor driven windlass 36, the drum 37 of which is oriented vertically so as to pay out a cable loop 38 horizontally and below the surface of the dock runway 22 or 22'. The loop 38 is held in tension by idler pulley 39 located in a recess in the dock beneath the dockboard 26. Two cable troughs extend between the windlass 36 and the pulley 39, each carrying one leg of the loop 38 and extending substantially parallel to the length of the dock runway 22. One of the cable troughs is substantially centered along the runway 22 and runway is slotted to provide continuous access to the leg of the loop 38 passing therethrough. If necessary, the dockboard 26 is also slotted, as shown in the various figures.

A wheel-equipped movable bulkhead 40 is fastened by means of clamp 41 to the leg of the loop 38 passing through the centered and open trough and thereby propelled in one direction or the other along the dock runway 22 or 22' according to the direction of rotation of the drum 37. Lying to either side of the clamp 41 are guide wheels 41a and 41b which ride on the internal surfaces of the centered trough, thus enabling the trough to act as a guideway for the bulkhead 40. In this manner the front face 44 of the bulkhead is maintained perpendicular to the length of the runway 22 throughout the limits of its travels. The driving connection between the motor 42 and the windlass drum 37 and the reversing mechanism therefor are not shown, but the design of such elements are well within the skill of those of ordinary skill in the art and could comprise a reversible gear box unit.

The bulkhead 40 is equipped on either side with internally threaded bolt holes 43, as shown in FIGURE 1, the purpose of which will be later clarified. The front face 44 of the bulkhead is approximately the same size as the width and height of the unitized load 15, being essentially flat and smooth. For best operation it is preferred that the face 44 be slanted forwardly slightly so that the top edge thereof is advanced approximately one inch over a 63 inch height.

While a great deal more could be said about the construction of the apparatus for supplying the motive power, such details do not play a part in the present invention and it is believed that the brief description above explains the general principles and mode of operation of one device capable of performing the function. Other details and even alternative means of providing motive power are well within the capabilities of those of ordinary skill in the art.

In use, the cooperation of the elements comprising the invention and the method by which loading and unloading of preassembled loads is accomplished will now be described. First of all, a sled 18 of the correct length for the load 15 is obtained, for example, by separation of the same from a roll of sled material. Then the sled 18 is laid flat on the dock runway 22, parallel thereto. It will be noted that at this time the movable bulkhead 40 is in its innermost position. If there is a tendency for the sled 18 to curl, preferably the sled 18 should be positioned so as to curl upwardly from the runway 22 as shown in FIGURES 1 and 5. Next, the load 15 is assembled, as described previously, on top of the sled, extending slightly outwardly therefrom about an inch on either side and positioned on the forward end thereof.

The van 17 may be placed in loading position at any time and should be centered as closely as possible with the dockboard 26 which is in its raised position on its hinge. The vertical guides are both pivoted inwardly so that the outer ends thereof are close together, within the confines of the loading dock. In its loading position the van 17, dockboard 26 and dock runway 22 are parallel and in close alignment. No special treatment of the van bed 29 is needed except that it is swept out to remove loose debris. In this connection, any truck acceptable for hand loaded cargo is acceptable for use with the present invention.

With the dockboard 26 still in its raised position, a van runway 32 of the correct length for the van 17 is cut from a supply of van runway material. The van runway 32 is placed loosely in the van 17 over the cargo receiving area of the bed 29, with the coated side uppermost. Then the vertical guides are swung outwardly until their outer ends contact the respective inner side walls of the van 17 and the dockboard 26 is lowered so that the distal end 28 thereof rests upon the van runway 32 on the van bed 29.

Next, the loading operation depicted in FIGURES 4 and 5 commences. The unloaded rearward end of the sled 18 is folded upwardly either over the top of the segments 15(a) and 15(g) or tucked under a layer of containers 16 therein, as shown. Then the movable bulkhead 40 is inched forward until the face 44 thereof contacts the side of segments 15(a) and 15(g). At this point a steady pushing or compacting force is exerted by the bulkhead 40 on the segments 15(a) and 15(g), the lower coefficient of static friction $f_{sd}$ permitting a portion 18a of sled 18 and the segments 15(a) and 15(g) thereon to start sliding along the sliding pathway toward segments 15(b) and 15(h). FIGURE 14 shows the space $S_1$ intermediate the adjacent segments 15(a) and 15(b) and the flat uncovered portion 18b of the sled 18 underlying the space prior to the time that the loading operation commences. Then, as segments 15(a) and 15(g) approach adjacent segments 15(b) and 15(h), the sled portion 18b folds upwardly upon itself, as illustrated in FIGURE 15. It will be seen that the folded portion 18b is sandwiched between the segments 15(a) and 15(b) in one row and between their aligned counterparts 15(g) and 15(h) in the other row.

Upon completion of the folding of the portion 18b, the segments 15(a) and 15(g) are in substantial contact with segments 15(b) and 15(h) respectively and the compacting force is continued, causing segments 15(b) and 15(h) to commence sliding on portion 18c of the sled 18 along with the segments 15(a) and 15(g) already in motion. As the four sliding segments approach segments 15(c) and 15(i), the portion 18d of the sled 18 (FIGURE 5) folds upon itself into a position between segments 15(b) and 15(c) in one row and 15(h) and 15(i) in the other, pressed tightly therebetween as contact is made.

Similarly, the compacitng force is continued so as to result in the cumulative and sequential movement above described until all of the adjacent segments in each row are in contact and each of the uncovered portions of the sled 18 initially intermediate the adjacent segments is folded upwardly upon itself and caught therebetween.

There is thus formed a compact load 15 from a group of segments which were originally in a spaced-apart relationship.

As mentioned above, the coefficient of kinetic friction between two surfaces is lower than the coefficient of static friction. Thus, the cumulative and sequential compacting movement imparted to the spaced segments requires less force than would be necessary if the whole of load 15 were to be simultaneously moved from a dead stop. For example, if the load 15 is in two rows of five segments each, then simultaneous movement of all 10 segments from a position at rest would require the force $F_1$ greater than the coefficient of static friction times the normal force to overcome the frictional force:

$$F_1 > fsN$$

where $fs$ = coefficient of static friction
$N$ = normal force which is equal to the weight of the load 15

In contrast, with the cumulative and sequential movement described above, the force $F_2$ which would be needed to overcome friction would have to be greater than the sum of .8 times the coefficient of kinetic friction plus .2 times the coefficient of static friction, multiplied by normal force.

$$F_2 > (.8fk + .2fs)N$$

where $fk$ = coefficient of kinetic friction and other symbols are the same as given above.

Since the normal force N is the same in both cases and since the coefficient of kinetic friction $fk$ is smaller than the coefficient of static friction $fs$, then the force $F_2$ required will be smaller than the force $F_1$.

Following the compacting of the load 15, it is moved along the pathway comprising the dock runway 22, dockboard 26 and van runway 32, without shifting the load 15 on the sled 18 or moving the van runway 32 from its position on the bed 29 of the van 17. For the reasons explained above, it is preferable to continue the application of the force which caused the load 15 to become compact so that the load does not come to rest between the compacting and the loading movements. Since the elements comprising the sliding pathway are presumably in direct alignment with the load 15, the loading operation proceeds without incident, being terminated by stopping the forward movement of the bulkhead 40 when the load 15 rests wholly with the cargo loading area of the van 17. If there is some misalignment in that the van 17 is not centered with the runway 22 or 22', then one of the vertical guides will contact the corresponding side of the load 15, funneling the sled supported cargo into the cargo receiving area of the van 17. When the compacted load 15 is in place within the van, it is not necessary to use any sort of dunnage or other forms of load stabilization devices between the segments comprising a row.

Then the windlass direction is reversed to move the bulkhead 40 to its innermost position, away from the van 17. Finally, the dockboard 26 is pivoted to its raised position and the vertical guides swung inwardly, out of the van interior, and the van 17 is ready to be transported to its destination. The whole loading operation described generally takes a matter of minutes, whereas the prior art methods described previously occasionally take several hours. It will be noted that load 15 still rests on sled 18 and that, in turn, is superposed over van runway 32, both of which are expendable and available for use in the unloading operation hereinafter described.

When the van 17 is positioned at the unloading dock at its destination the unloading operation may commence. The unloading station is desirably of the same construction as the loading station previously described, i.e., with a motive power apparatus 35, dock runway 22 or 22' and dockboard 26. No vertical guides 30 and 31 are needed for the unloading operation but if provided at a combined loading-unloading station, will not interfere with the load 15 transfer. In such a case the vertical guides 30 and 31 may be placed as they were during the loading operation, or, alternatively, each rotated 180° to completely remove them from the intended path of unloading.

The unloading operation and the apparatus used therefore are shown most specifically in FIGURES 6, 7 and 8. FIGURE 7 illustrates the construction of a preferred embodiment of a drawbar 45 used to apply a pulling force uniformly across the width of the sled 18. A 5 inch square low carbon steel tube having $\frac{3}{16}$ inch thick walls and a length of about 86 inches has proven satisfactory. While the specific design of the drawbar may be varied according to the preference of the user, it is essential that under the conditions of use the drawbar should not deflect sufficiently to create an imbalance of tension across the sled 18 which could result in portions thereof being loaded in excess of its ultimate tensile strength, thereby causing the sled 18 to rupture. There are provided at each end of a pair of opposed sides of the drawbar 45 holes or apertures 46 of sufficient size to accept the threaded angularly disposed end of pull bars 47.

The two pull bars 47, one of which is also depicted in FIGURE 7, are substantially identical and comprise $\frac{5}{8}$ inch diameter rods of low carbon steel, one end thereof being threaded and bent upwardly so as to form a 90° angle with the central portion thereof. The other end is flattened in the same plane as that including the upwardly bent end and has a bolt clearance hole drilled through it for connection to the bulkhead 40.

The first step of the unloading operation is to secure the sled 18 to the drawbar 45. While clamps, etc. could perform this function, the preferred means is by smoothly wrapping the unloaded rearward end of the sled 18 two complete turns around the drawbar 45. In its wrapped position the drawbar 45 is substantially perpendicular to the length of the sled 18.

Next, the upwardly bent end of a pull bar 47 is inserted through each of the oppositely disposed apertures 46, and a nut used to hold it in position, as illustrated in FIGURE 7. Then the bulkhead 40 is brought adjacent to the drawbar 45 and its position adjusted in or out by "inching" movements, until the bolt clearance holes at the other end of each of the pull bars 47 is lined up with the bolt holes 43 on the respective sides of the bulkhead 40, as shown in FIGURES 5 and 8. At this point a bolt 43a may be inserted through each bolt clearance hole and screwed into firm engagement with the threads of the corresponding bolt hole 43.

The bulkhead 40 is then moved smoothly away from the van 17, the attached drawbar 45 pulling the sled 18 with the load 15 thereon to remove the load from the van 17. In the withdrawal of the load 15, the segments 15(a) and 15(g) are caused to move first, sliding on section 18a of the sled 18 with the balance of the load immobile until the portion 18b unfolds. Further withdrawal causes segments 15(b) and 15(h) to start sliding in spaced relation with segments 15(a) and 15(g) respectively, as shown in FIGURE 8. With the outward movement of the segments 15(b) and 15(h), the portion 18d unfolds whereby continuation of withdrawal effects sliding movement of segments 15(c) and 15(i). Thereafter, further withdrawal sequentially causes the spacing and movement of the balance of the segments to occur.

While this sequential separation and cumulative unloading movement is in progress, the load is pulled up the dockboard 26. Then the spaced load 15 is drawn along the dock runway 22 or 22', to the position desired, the sliding movements being permitted by virtue of the coefficients of static and kinetic friction previously described. The van runway 32 remains in position on the bed 29 of the van 17 and may be reused in loading the van, if undamaged.

Following the above, the pull bars 47 are removed from attachment to the bulkhead 40 and from engagement within the apertures in the drawbar 45. Then the drawbar 45 is unwound from the sled 18 and the load dispatched to other locations as desired. Since the segments once more are spaced apart, clamp trucks may conveniently and economically handle the load without any further operations. The sled 18 may also be reused if undamaged, and it has been found that the average number of uses of such sleds is about 5.

If the destination has no prepared unloading station such as described above, it is still possible to use the sled-slide path principle described above. In this case, however, the van runway would initially be cut to a length sufficient not only to cover the length of the van 17, but also to form a slide path extending into the receiving warehouse. During the loading operation the dockboard 26 would cover the material in excess of the van 17 length. After loading, the excess van runway material would be rolled up and placed within the van 17 and transported with the load 15. Later, at the unloading station the excess material would be unrolled up over the dockboard at the receiving warehouse and across the floor thereof to an unloading position. Thereafter, the unloading operation would proceed as described above, utilizing any form of apparatus available to apply the pulling force. For example, a heavy fork lift truck could be used to tow some loads from the van 17.

Thus, it will be seen that there is provided an economical method and inexpensive apparatus to accomplish the loading and unloading of unitized loads in vehicles for transport. The invention combines means to substantially reduce the waiting time of vehicles at both loading and unloading docks with a practical and effective method of facilitating the use of clamp trucks and is capable of materially reducing the handling of the cargo during shipment.

Many modifications of the above invention may be used and it is not intended to hereby limit it to the particular embodiments shown or described. The terms used in describing the invention are used in their descriptive sense and not as terms of limitation, it being intended that all equivalents thereof be included within the scope of the appended claims.

What is claimed is:

1. A method of loading a vehicle characterized as being a unitized loading method which comprises:
   (A) providing a substantially smooth slide path in direct alignment with said vehicle and extending continuously from a unitizing area into the cargo loading area of said vehicle,
   (B) positioning a thin flexible web comprising a sled on said slide path at the unitizing area with the length of the sled parallel to the length of said slide path,
   (C) assembling the total load, consisting of a plurality of smaller load segments, on said flexible sled in at least one row and in such a manner that each of the segments in the row is positioned in longitudinal alignment and spaced from the segment adjacent thereto,
   (D) causing a sequential and cumulative movement of the segments in the direction of said cargo loading area and parallel to the length of said slide path, substantially all of said movement being accomplished by sliding action between the lower surface of the sled and the slide path, whereby each of the unloaded portions of said flexible sled intermediate the adjacent segments folds upwardly upon itself and said segments are substantially brought into contact so as to result in a longitudinally compacted load, and
   (E) thereafter transporting the longitudinally compacted load into the cargo loading area of said vehicle by sliding the loaded sled along said slide path.

2. The method of claim 1 in which the sequential and cumulative movement of the segments is caused by a pushing force acting substantially uniformly across the width and height of the segment furthermost removed from said vehicle.

3. The method of claim 2 in which said pushing force is continuously applied from the initial point of application thereof until said longitudinally compacted load is in position in the cargo loading area of said vehicle.

4. A method of loading a vehicle which comprises:
   (A) providing a rigid runway over which the load is to be transported,
   (B) positioning thereon a flexible sheet material, the coefficient of friction between said flexible sheet material and the surface of the runway being minimal,
   (C) assembling the total load consisting of a plurality of smaller units on said flexible sheet in such a manner that the units are in a spaced-apart relationship and lying in substantially a straight row,
   (D) applying a compacting force to the units causing said flexible sheet material located intermediate the spaced-apart units to fold upon itself, and
   (E) thereafter transporting the assembled compacted load by way of said flexible sheet material over the runway into the vehicle, whereby the units when pulled from the vehicle will be separated into said spaced-apart relationship facilitating the further handling of said units.

5. The method of placing a pre-assembled load in a vehicle which comprises:
   (A) providing a substantially smooth runway extending into the vehicle and over which the load is to be transported,
   (B) positioning a thin, flexible web-like sled flat on the runway,
   (C) placing a multiplicity of units on the sled in at least one row which extends toward the vehicle, each of the units in each row being spaced from those adjacent thereto in the row by a distance of at least about 4", the sum of said units constituting the whole of the preassembled load to be placed in said vehicle,
   (D) applying a force to the unit which is furthest from the vehicle to cause that unit and the portion of the sled directly underlying it to slide in unison in the direction of the vehicle until that unit substantially contacts the unit contiguous thereto, the portion of the sled initially below the space which intervened the contacting units being folded upwardly upon itself and sandwiched between the contacting units,
   (E) continuing the application of said force to similarly move the contacting units to the end that each unit will sequentially slide to and contact its adjacent unit and cause the sled portion therebetween to be folded upwardly upon itself, thereby forming a compact preassembled load, and
   (F) transporting the compact preassembled load into the vehicle by sliding the sled along the runway.

6. A method of loading a vehicle with a plurality of load segments which comprises:
   (A) providing a substantially smooth slide path in alignment with said vehicle and extending continuously from a load placement area to a cargo area in said vehicle,
   (B) positioning a thin flexible web comprising a sled on said path at the load placement area with the length of the sled parallel to the length of said slide path,
   (C) placing a plurality of load segments on said flexible sled in such a manner that the said segments are aligned with the sled length and spaced from one another,
   (D) causing a sequential and cumulative movement of the segments from said load placement area along said slide path, substantially all of said movement being accomplished by sliding action between the lower surface of said sled and the slide path, whereby the unloaded portion of said flexible sled intermediate the adjacent segments folds upwardly upon itself and said segments are substantially brought into contact so as to result in a longitudinally compacted load, and (E) thereafter transporting the longitudinally compacted load along said slide path to the cargo area in which the cargo of load segments is to be placed.

References Cited by the Examiner

UNITED STATES PATENTS

| | | | |
|---|---|---|---|
| 2,186,463 | 1/40 | Maine | 214—38 |
| 3,012,681 | 12/61 | Kelly | 214—38 |
| 3,040,914 | 6/62 | Johnson et al. | 214—38.8 |

HUGO O. SCHULZ, *Primary Examiner.*

GERALD M. FORLENZA, *Examiner.*